US008780443B2

(12) United States Patent
Engelmann et al.

(10) Patent No.: US 8,780,443 B2
(45) Date of Patent: Jul. 15, 2014

(54) METHOD AND ARRANGEMENT FOR CONTROLLED ACTUATION OF A MICROSCOPE, IN PARTICULAR OF A LASER SCANNING MICROSCOPE

(75) Inventors: Ralf Engelmann, Jena (DE); Joerg Michael Funk, Jena (DE); Bernhard Zimmerman, Jena (DE); Ralph Netz, Jena (DE); Frank Hecht, Weimar (DE)

(73) Assignee: Carl Zeiss Microscopy GmbH, Jena (DE)

( * ) Notice: Subject to any disclaimer, the term of this patent is extended or adjusted under 35 U.S.C. 154(b) by 296 days.

(21) Appl. No.: 12/578,202

(22) Filed: Oct. 13, 2009

(65) Prior Publication Data

US 2010/0097694 A1 Apr. 22, 2010

Related U.S. Application Data

(63) Continuation of application No. 11/783,290, filed on Apr. 6, 2007, now abandoned.

(30) Foreign Application Priority Data

Jul. 28, 2006 (DE) .......................... 10 2006 034 914

(51) Int. Cl.
*G02B 21/06* (2006.01)
*G02B 27/14* (2006.01)
*G02B 27/09* (2006.01)
*G02B 21/00* (2006.01)

(52) U.S. Cl.
CPC ............ *G02B 21/06* (2013.01); *G02B 27/0972* (2013.01); *G02B 21/00* (2013.01)
USPC ............ 359/385; 359/368; 359/629; 359/618

(58) Field of Classification Search
CPC ........ G02B 21/00; G02B 21/06; G02B 27/09; G02B 27/0938
USPC .......................................... 359/368–390, 900
See application file for complete search history.

(56) References Cited

U.S. PATENT DOCUMENTS 4,283,115 A * 8/1981 Fraissl .......................... 359/629
4,796,997 A * 1/1989 Svetkoff et al. ............... 356/608

(Continued)

FOREIGN PATENT DOCUMENTS

DE 198 29 981 A1 1/2000
DE 10 2004 016 433 A1 10/2005
DE 10 2004 034 987 A1 2/2006

*Primary Examiner* — Thong Nguyen
(74) *Attorney, Agent, or Firm* — Westerman, Hattori, Daniels & Adrian, LLP

(57) ABSTRACT

Method for actuation control of a microscope, in particular of a Laser Scanning Microscope, in which, at least one first illumination light, preferably moving at least in one direction, as well as at least one second illumination light moving at least in one direction, illuminate a sample through a beam combiner, a detection of the light coming from the sample takes place, whereby, at least one part of the illumination light is generated through the splitting of the light from a common illuminating unit, characterized in that, by means of a common control unit, a controlled splitting into the first and the second illumination light takes place, in which the intensity of the first illuminating light, specified by the user or specified automatically, is assigned a higher priority (is prioritized) compared to the specified value for the second illumination light, and an adjustment for the second illumination light takes place until a maximum value is obtained, which is determined by the value specified for the first illumination light.

4 Claims, 12 Drawing Sheets

(56) References Cited

U.S. PATENT DOCUMENTS

| | | |
|---|---|---|
| 5,034,613 A | 7/1991 | Denk et al. |
| 6,094,300 A | 7/2000 | Kashima et al. |
| 6,159,749 A | 12/2000 | Liu |
| 6,462,345 B1 | 10/2002 | Simon et al. |
| 2004/0191645 A1* | 9/2004 | Taniguchi et al. ............... 430/5 |
| 2006/0012864 A1 | 1/2006 | Funk et al. |
| 2007/0133086 A1* | 6/2007 | Wilhelm et al. ............ 359/385 |
| 2007/0159689 A1 | 7/2007 | Schau et al. |

* cited by examiner

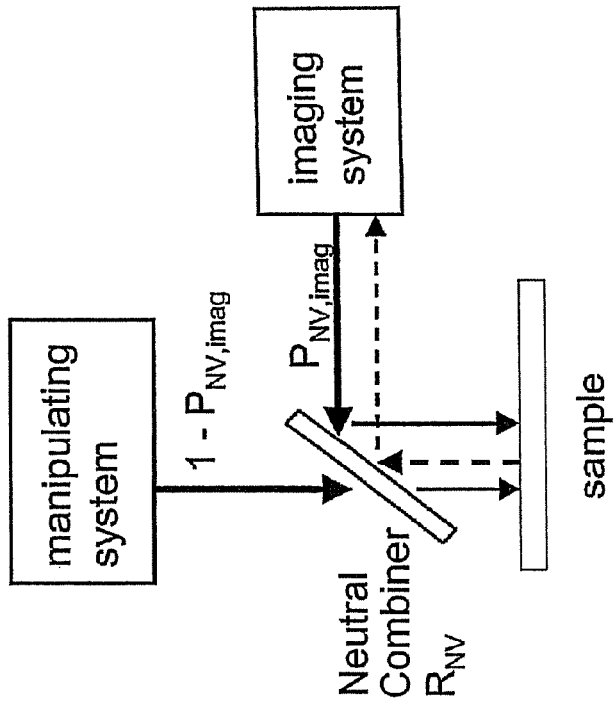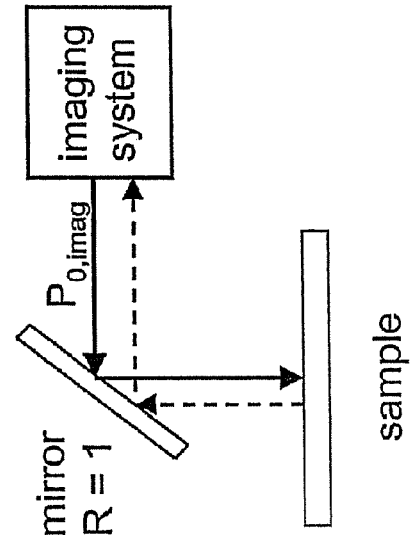

↓ Excitation or manipulation light (each with wavelength λ)

↓ Fluorescence signal light (Stokes-shifted wavelength $\lambda_{Fl}$)

METHOD AND ARRANGEMENT FOR CONTROLLED ACTUATION OF A MICROSCOPE, IN PARTICULAR OF A LASER SCANNING MICROSCOPE

CROSS-REFERENCE TO RELATED APPLICATIONS

The present patent application is a continuation of application Ser. No. 11/783,290, filed Apr. 6, 2007, now abandoned, which is incorporated herein by reference in its entirety.

BACKGROUND OF THE INVENTION (1) Field of the Invention

The present invention relates to a method and apparatus for the controlled actuation of a microscope, in general, and to controlled actuation of a laser scanning microscope having multiple light sources, in particular.

(2) Description of Related Art

Confocal microscopy is, among other things, the tool for defined controlled actuation of micro-objects. Based on that, numerous methods for examination and influencing of microscopic objects were proposed, thus, for instance, by Denk in U.S. Pat. No. 5,034,613, by Liu in U.S. Pat. No. 6,159,749, or by Karl Otto Greulich in "Micromanipulation by Light in Biology and Medicine" in 1999.

A combination comprising an image-forming point scanning or line scanning system and a "manipulator" system is increasingly finding more and more interest in professional circles.

The interest in the observation and analysis of fast microscopic processes has brought forth new devices and methods (for example Carl Zeiss Line Scanner LSM 5 LIVE), which, in combination with the above mentioned methods of manipulation, lead to new insights. Thereby, the simultaneous microscopic observation of radiation-induced manipulation of samples with spatial resolution by means of a suitable imaging system stands especially in the foreground (See for example U.S. Pat. No. 6,094,300 and DE 102004034987 A1). Therefore modern microscopes attempt to offer as many flexible and optically equivalent decoupling and coupling ports as possible (See: DE 102004016433 A1).

The availability at the same time of at least two coupling ports for independent scan systems is thereby of special importance in order to avoid limitations in temporal resolution due to the slowness of mechanical switching processes. Besides the tube interface, other coupling ports on the sides of the microscope stand are possible (preferably in the extended infinite space between the microscope objective and the tube lens; the so-called "sideports") as well as on the rear side of the stand (typically optically modified incident light axis or transmitted light axis with suitable tube lens; the "rearports") as well as on the bottom side (the "baseport").

Thereby, arrangements with a common direction of the incident light (either reflected or transmitted light) or with a direction opposite to the incident light (transmitted light and reflected light) are possible in principle. Apart from the viewpoint of the applicability, a common direction of incidence is frequently preferred from the device-technical viewpoint. In that case, use of at least one element is necessary, which combines the beam paths of both devices in the space between the scanners of the scan systems that are to be operated simultaneously and the objective. Thereby, according to the state-of-the-art, a diverse variety of beam-combining elements are conceivable, such as, for example, optomechanical components, like suitably coated beam combiner flat plates and beam combiner wedges, beam combiner cubes and polarizing splitters. Conceivable are further beam combining acousto-optical modulators and deflectors.

BRIEF SUMMARY OF THE INVENTION

The present invention relates to a method and apparatus for actuation control of a microscope, in particular of a Laser Scanning Microscope, in which, at least one first illumination light, preferably moving at least in one direction, as well as at least one second illumination light moving at least in one direction, illuminate a sample through a beam combiner. A detection of the light coming from the sample takes place. At least one part of the illumination light is generated through the splitting of the light from a common illuminating unit. A common control unit accomplishes a controlled splitting of the illumination light into the first and the second illumination lights. The intensity of the first illuminating light, as specified by a user or specified automatically, is assigned a higher priority (is prioritized) compared to the specified value for the second illumination light, and an adjustment for the second illumination light takes place until a maximum value is obtained, which is determined by the value specified for the first illumination light.

BRIEF DESCRIPTION OF THE SEVERAL VIEWS OF THE DRAWINGS

FIGS. 8a-8c are schematic diagrams showing the derivation of a beam combiner design embodying the present invention;

DETAILED DESCRIPTION OF THE INVENTION

In the following, reference is made in particular to DE 102004034987 A1, which is incorporated by reference herein as if reproduced in full and which forms a part of the subject matter of the present publication.

Figure 1A:
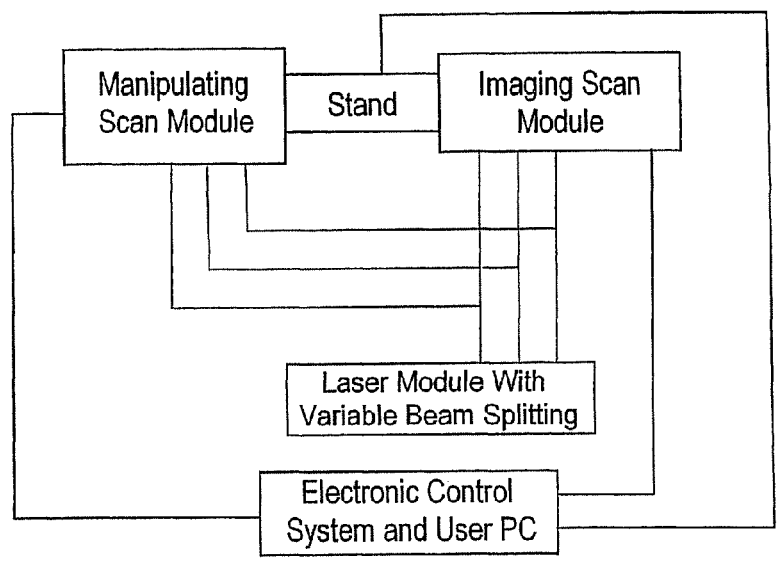
FIG. 1a is a schematic diagram of system which enables simultaneous operation of a manipulating and an imaging scan module in a microscope stand.

FIG. 1a shows schematically the design of a device system, which enables simultaneous operation of a manipulating and an imaging scan module in a microscope stand. The modules are provided with a common actuation control system (control system, PC) and the laser or the laser modules are connected optically and controllably with both the scan modules.

Figure 1B:
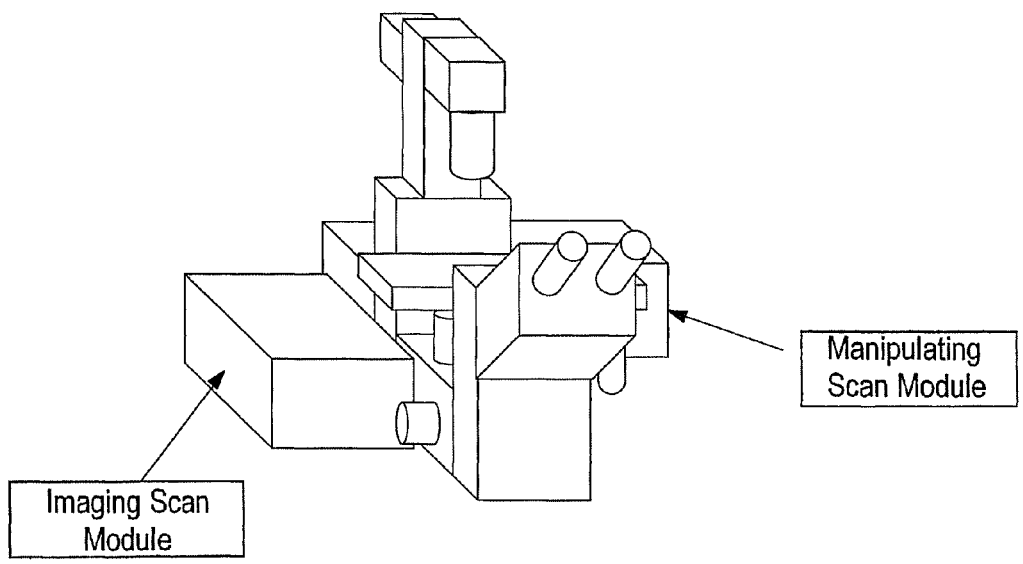
FIG. 1b is a schematic drawing of an inverse microscope stand.

In FIG. 1b, an embodiment with an inverse stand is shown by way of example.

Figure 1C:
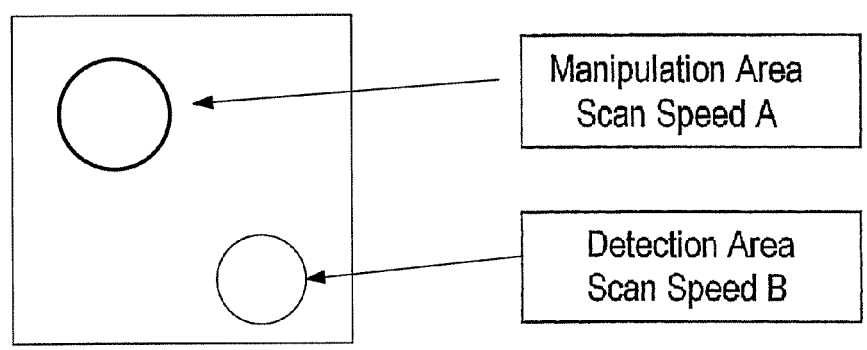
FIG. 1c is a schematic diagram illustrating regions of interest and variable scanning rates.

In a preferred embodiment, the electronic actuation of the microscope stand and the coupled manipulation and the imaging module are suitably equipped using a real-time electronic control system with an integrated real-time computer for the processing of high data rates. Thereby, such embodiments are conceivable in which the scan systems of the manipulations and the imaging modules coupled with the microscope stand can be actuated in synchronous or asynchronous manner. Thus simultaneous scan modes of both the modules are possible in which manipulation and imaging in the different regions of the sample (ROIs; "regions of interest" DE 19829981 C2) with variable scanning rates takes place as in FIG. 1c.

Both for the manipulating system as well as for the imaging system, the useful spectral range can be extended, depending on the respective application, from the ultraviolet to the infrared spectral range. Manipulation wavelengths typically found in the applications are, for instance, 351, 355 and 364 nm (photo-uncaging), 405 nm (photoconversion, Kaede, Dronpa, PA-GFP), 488 and 532 nm (photobleaching, FRET, FRAP, FLIP) as well as 780-900 nm (multiphoton bleaching, for example MPFRAP, 2-photon uncaging; and direct multiphoton stimulation).

Figure 2:
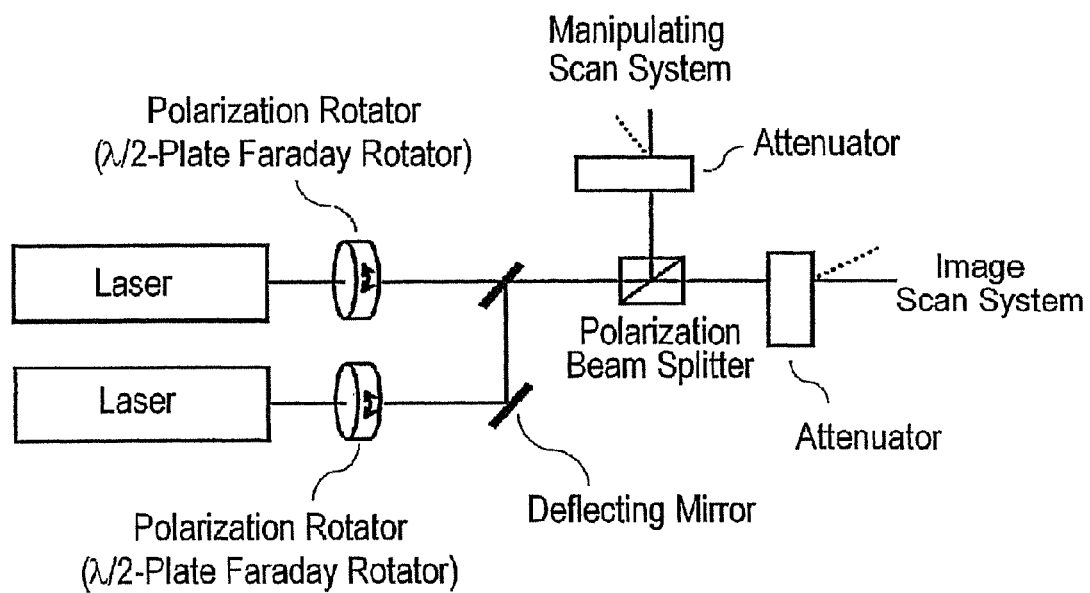
FIG. 2 is a schematic diagram of two independent scan modules with variable beam splitting.

Since in many applications, both the manipulating as well as the imaging system employ the same laser wavelengths, it is reasonable to feed both the scan modules with a common laser source. In DE 102004034987 A1 different suitable arrangements for variably adjustable division of the beam between two independent scan modules are described:

a. Laser-specific, variable beam splitting with a rotatable λ/2-plate and polarizing beam splitters (ref. FIG. 2):

By using a motorized rotatable λ/2-plate before each laser and a polarizing beam splitter cube in the combined beam path of all lasers, a variable, loss-free beam splitting into two illumination channels takes place. Thereby, by rotating the λ/2-plate by an angle θ, the polarization of the incident polarized laser is rotated by an angle 2θ. The horizontally and the vertically polarized components of the field amplitude are split by the subsequent polarizing beam splitter cube (Glan-Taylor prism). Thereby the horizontally polarized light is transmitted and the vertically polarized light is reflected. By rotating the λ/2-plate from 0° to 45° the polarization of the incident beam is rotated from 0° to 90° and the beam intensity is thus divided continuously and variably between the split partial beams. The intensity of the split laser beams can be modulated in any of the illumination channels individually with the help of an appropriate light modulator (for example graduated, acousto-optical modulators like Pockels cells). When different laser sources are used in which their beams are combined as in FIG. 2, this method of variable beam splitting is particularly practicable, if the individual beam combiners of the laser module are largely independent of the polarization.

Figure 3:
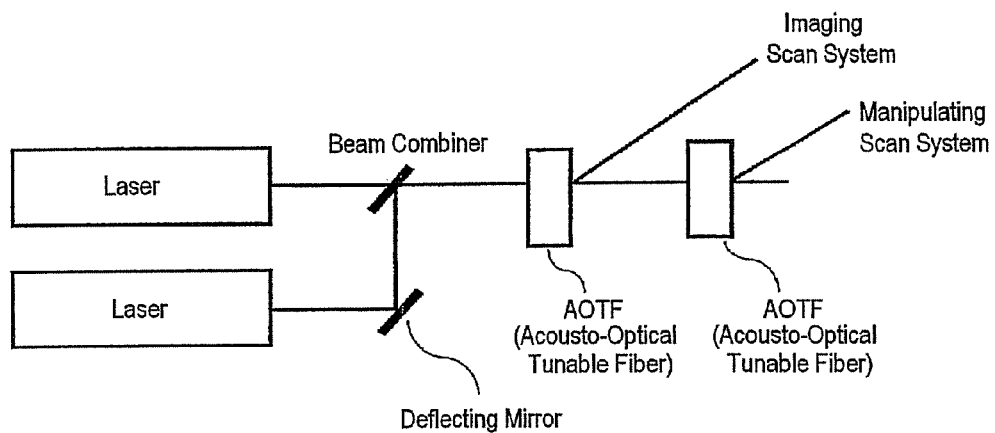
FIG. 3 is a schematic diagram showing beam splitting using two AOTFs.

In addition to that, the fact that a finite switching time is necessary for the rotation of the λ/2-plate must be taken into account. Therefore a limitation from the viewpoint of the applications arises in the case of this method precisely then, when the manipulation and the fast imaging take place sequentially at time intervals of less than this switching period for the same wavelength and, in addition to that, the sum of the laser power required for both partial processes exceeds the total available. The described method can be employed with advantage especially then, when the same laser line can be used simultaneously in the manipulating as well as in the imaging system. This is true particularly in photobleaching applications, such as, for instance, FRET, FRAP and FLIP.

b. This application-related limitation can however be eliminated, if, in lieu of the rotatable λ/2-plate, fast electro-optic or magneto-optic polarizing rotators (for example Pockels cells, Faraday rotators or LC retarders) are used, which have switching periods in the microsecond range or shorter (FIG. 2).

c. A variable, wavelength-specific beam splitting into two illumination channels can be done also with two AOTFs (acousto-optical tunable filter) arranged successively one after the other as in FIG. 3, whereby, for instance, the 1st order of diffraction of the first AOTF is used for coupling in the imaging system, whereas the 0th order of diffraction is coupled in through a second AOTF in the manipulator module (FIG. 3).

The imaging should thereby not be impaired by switching over of the bleaching ROI.

Figure 4:
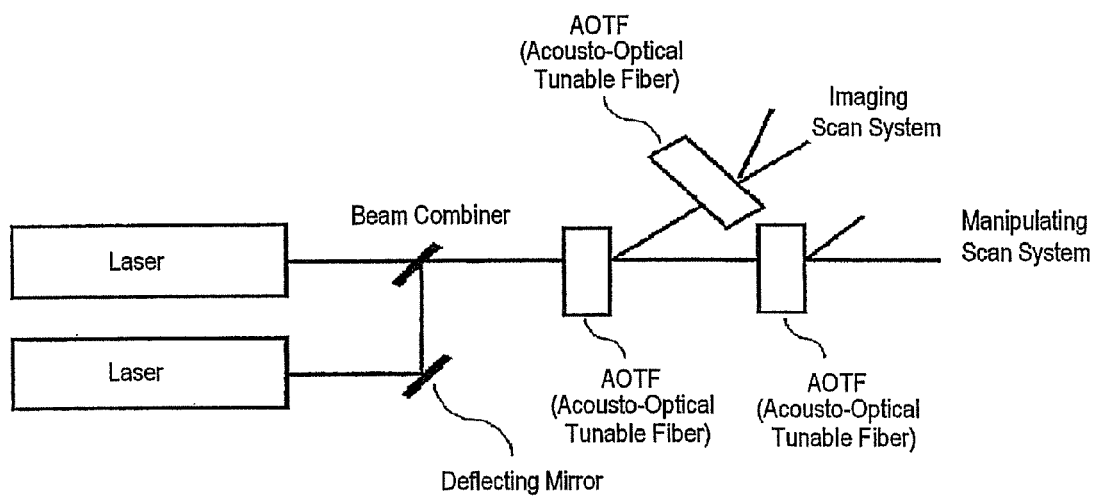
FIG. 4 is a schematic diagram of variable beam splitting using multiple AOTFs.

This method has the disadvantage in applications that in case of simultaneous manipulation and imaging, the second manipulator AOTF must be adjusted simultaneously through software control with the switching of the first AOTF (for example switching off of the laser power of the imaging system at the reversal points of the raster scan).

d. A variant of c. without functional limitations can be realized when an AOTF is exclusively used for variable beam splitting between two illumination channels and the laser power can be adjusted separately in both channels through two other AOTFs (FIG. 4).

e. A simple economical method for beam splitting can be realized with the help of a neutral graduating wheel with different positions or a continuously coated neutral filter wheel or a neutral slider (graduated filter).

Figure 5:
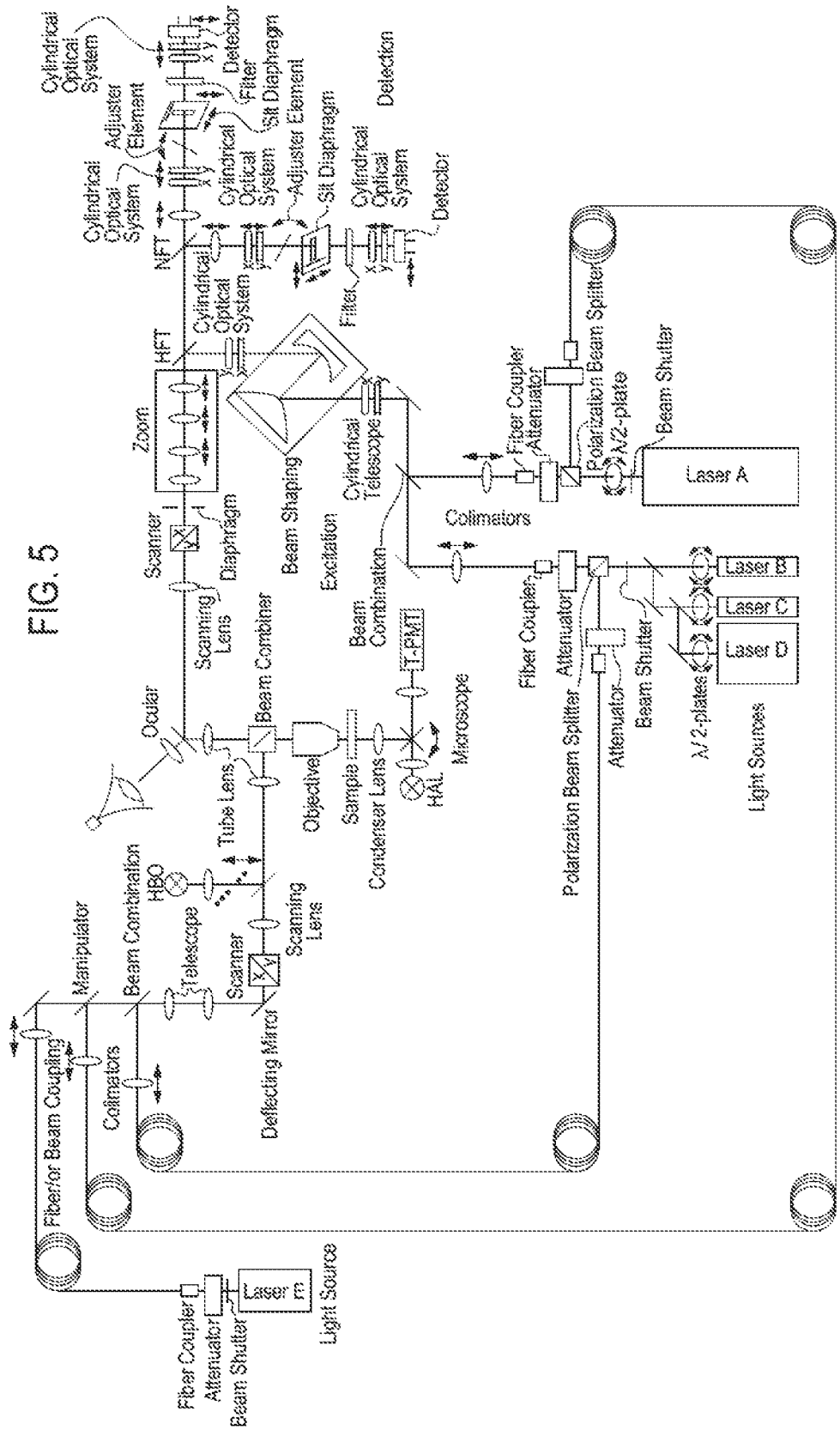
FIG. 5 is a schematic diagram of a microscope system which enables real-time microscopic imaging with sample manipulation.

FIG. 5 shows an embodiment of a microscope system by way of example, which enables real-time microscopic imaging with a line scanner (right) that takes place simultaneously with the manipulation of the sample (point scanner left). In this way, both of the independent scan systems use the laser sources A-D jointly, whereby the power is divided in a variably tunable ratio between these two modules according to method a described above. The unification of the optical axes of the manipulating and the imaging system takes place in the region of the finite space between the microscope objective and the tube lens by means of a beam combiner. A systematic description of numerous other embodiments can be found in DE102004034987 A1.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

If the manipulating, as well as imaging, systems compete for the power of the laser line in such a manner that it is as high as possible in the simultaneous operation in this type of microscope system, it is an advantage if the power requirement of the imaging system has a higher priority compared to the manipulator module. In commercial laser scanning microscope systems with only one scan module, typically the laser power for the manipulation process and the subsequent imaging can in each case be adjusted through the operating interface of the control software. This takes place, for example, using the corresponding software slider. In contrast to that, in the methods for simultaneous, variably tunable division of a laser line between two independent scan systems, shown in FIGS. 2, 3 and 4, besides the specification of the power for the manipulating and the imaging systems, adjustment of the splitting ratio between the two split up branches of the beams is also necessary.

According to the invention, the beam-splitting ratio as well as the subsequent intensity modulation are so optimally adjusted that, on one hand, the laser power requirement of the imaging system is fulfilled (higher priority) and, on the other hand, the manipulating system also receives laser power that is as high as possible at the same time. This makes it necessary to provide a method for optimal management of the laser power that is as automatic as possible, in which the user of the device only needs to define the laser powers necessary for imaging and manipulation in the customary manner (as in LSM systems with only one scan module) and, against that, the control software takes care on its own of the optimal tuning of the components shown in FIGS. 2, 3 and 4.

Figure 7A:
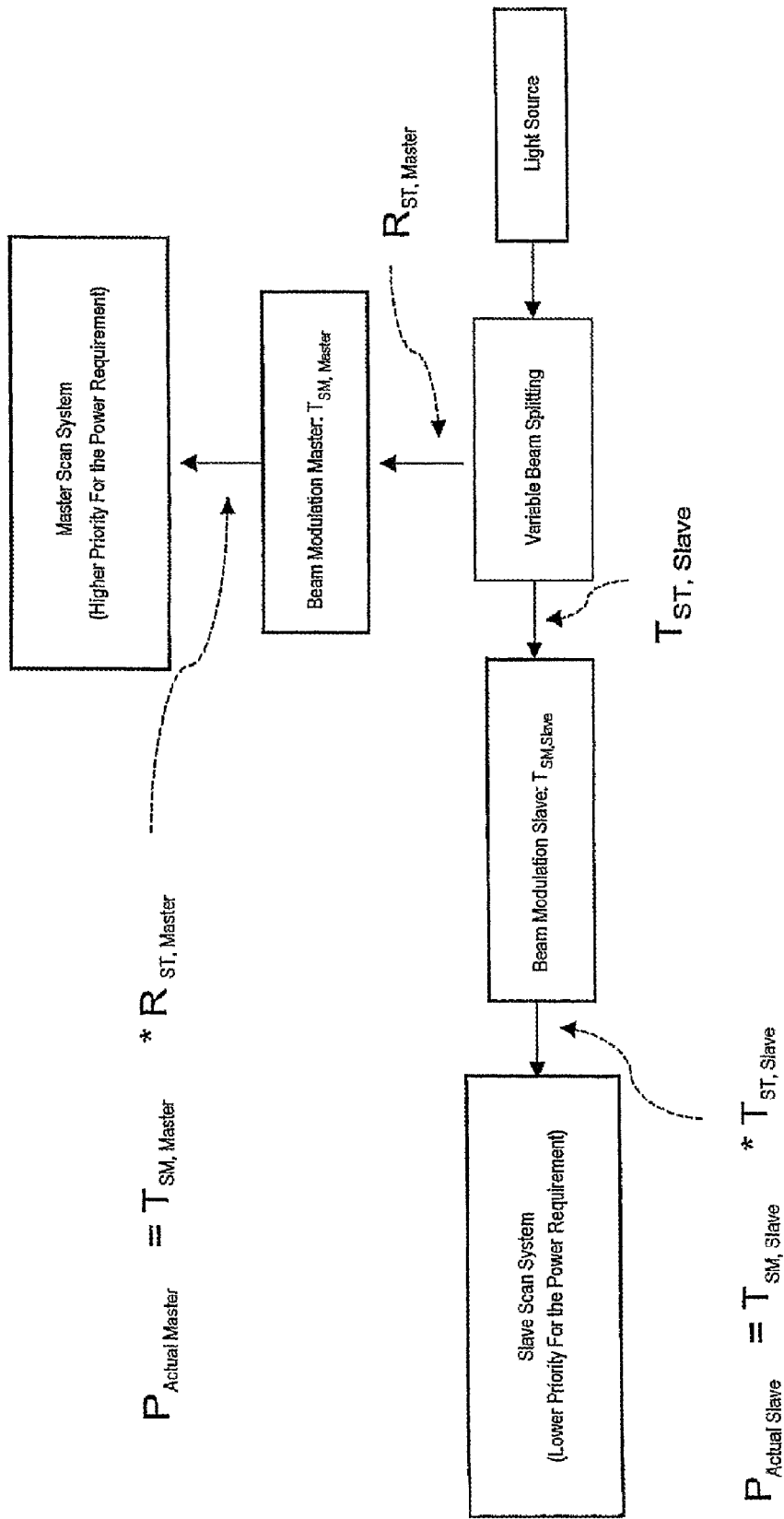
FIGS. 7a-7c are flow charts illustrating implementation of actuation control.
Figure 7B:
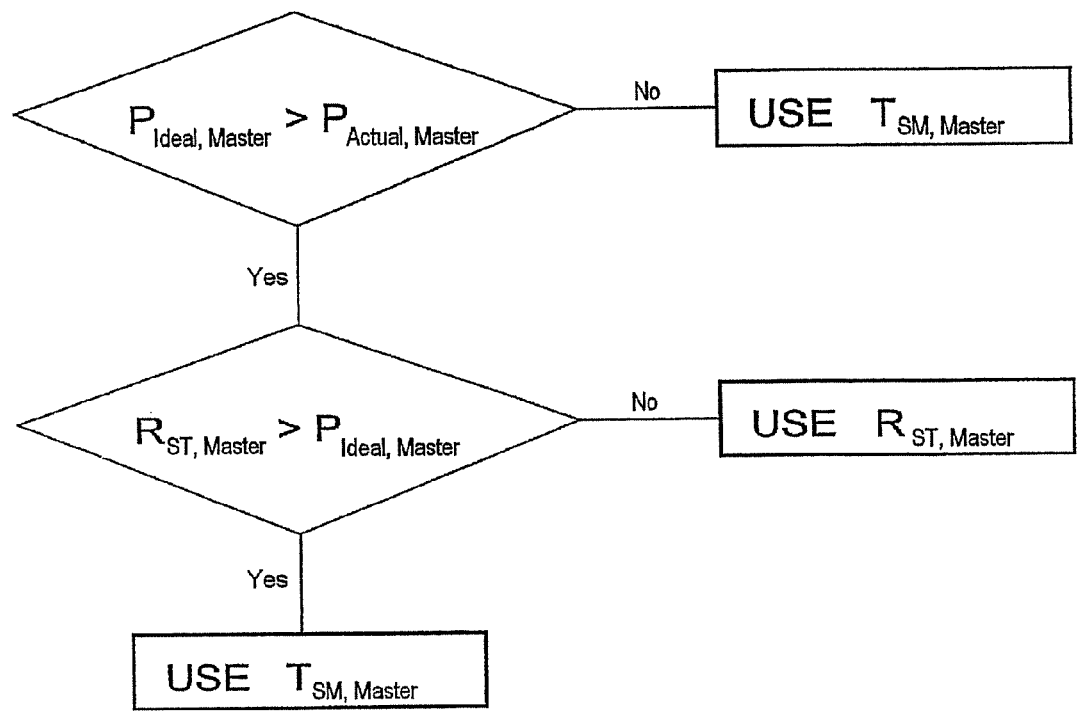
Figure 7C:
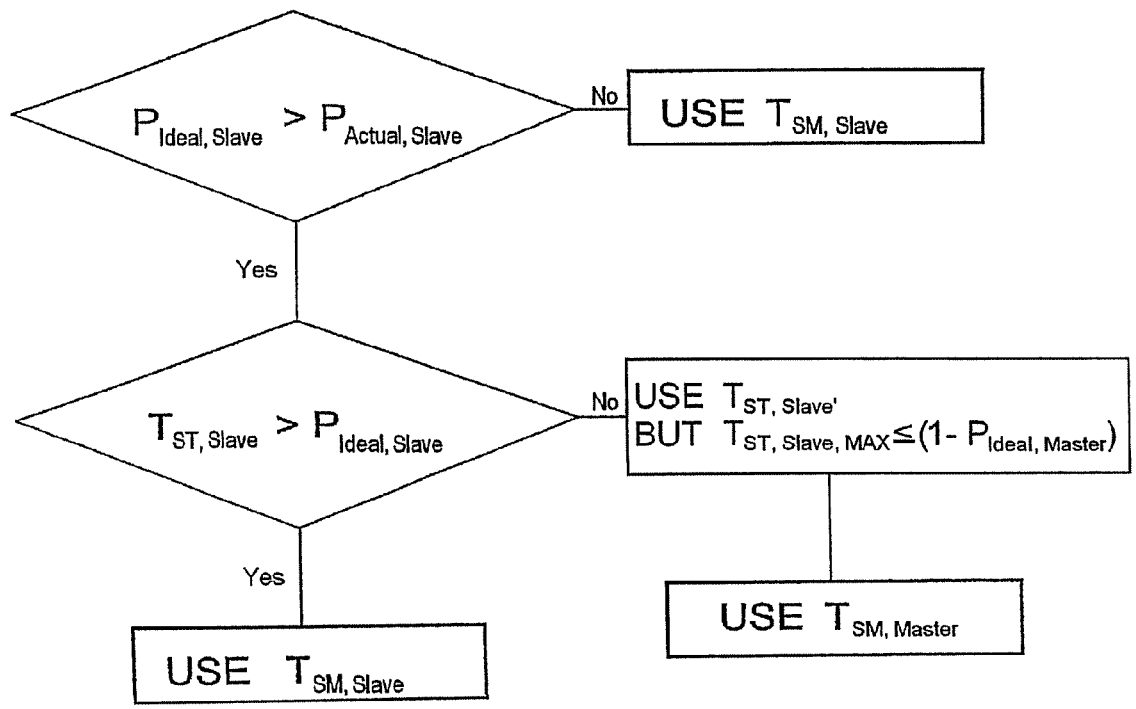

Implementation of this principle of the actuation control, shown in the flow charts in FIGS. 7a-7c for the layouts for the variable splitting of the beam shown in FIGS. 2, 3 and 4, solves the problem of the management of the laser power that is as automated and optimal as possible in the simultaneous operation of two independent scan modules.

This principle is explained as follows on the basis of the variable splitting of the beam by means of a rotatable λ/2-plate and intensity modulation of the two split partial beams by means of an AOM (acousto-optic modulator).

The AOMs correspond, for instance, to the attenuators in the beam paths to the manipulator or the line scanner shown in FIGS. 2 and 5, wherein the rotatable λ/2-plates are arranged after the lasers and exercise influence in both paths.

The principle of the controlling actuation shown generally in FIGS. 7a-7c can thereby be employed in analogous manner, if the other elements as in FIGS. 2, 3 and 4 and the above described methods a. to e. are used for beam splitting and intensity modulation.

As already explained above, in most of the applications, the power for the light required by the imaging system has the first priority. The imaging system (for example the line scanner in FIG. 5) is therefore denoted also as the "Master" system following the nomenclature selected in FIG. 7.

Figure 10:
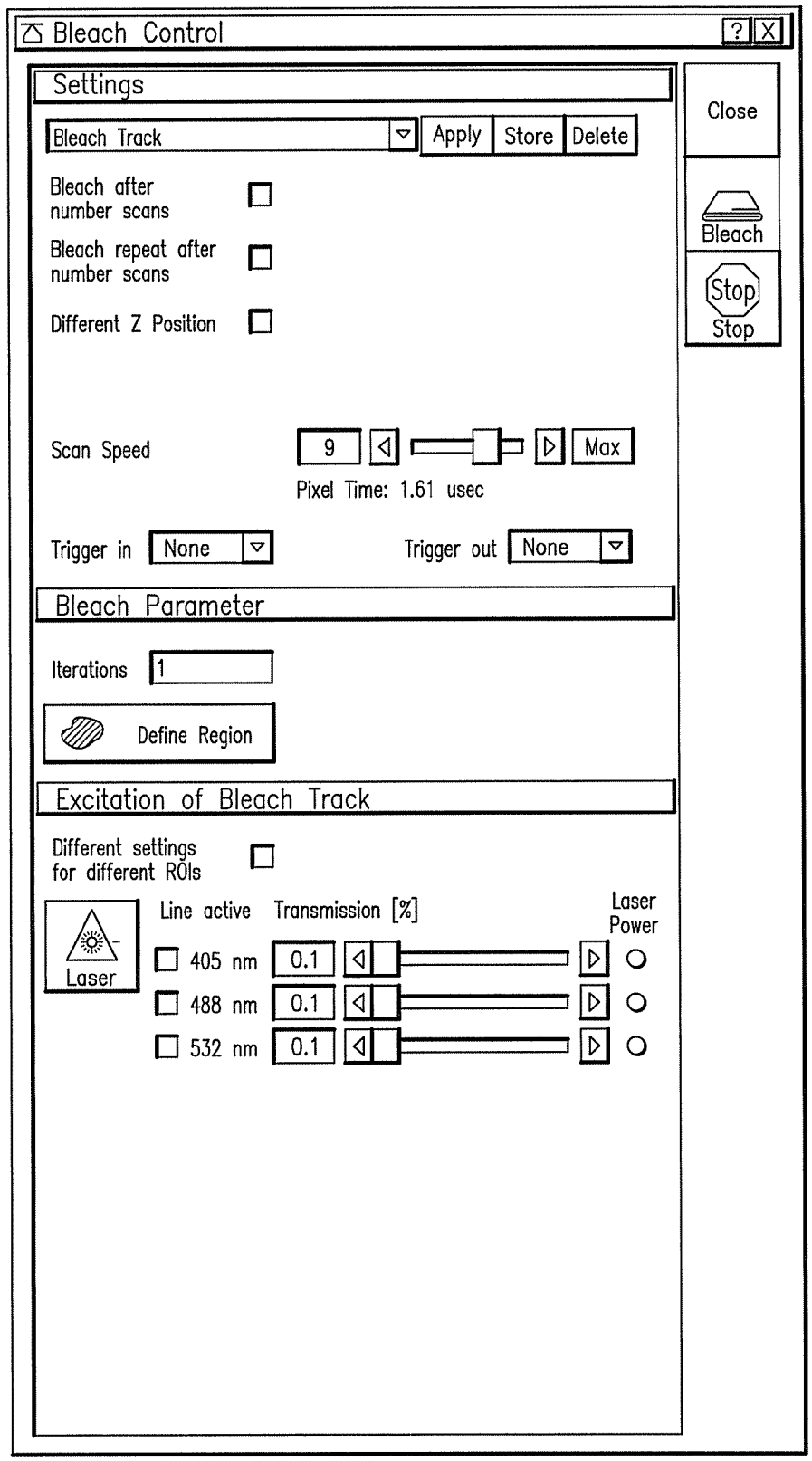
FIG. 10 is a screenshot of a user interface for a user for the bleaching as the manipulation method.
Figure 11:
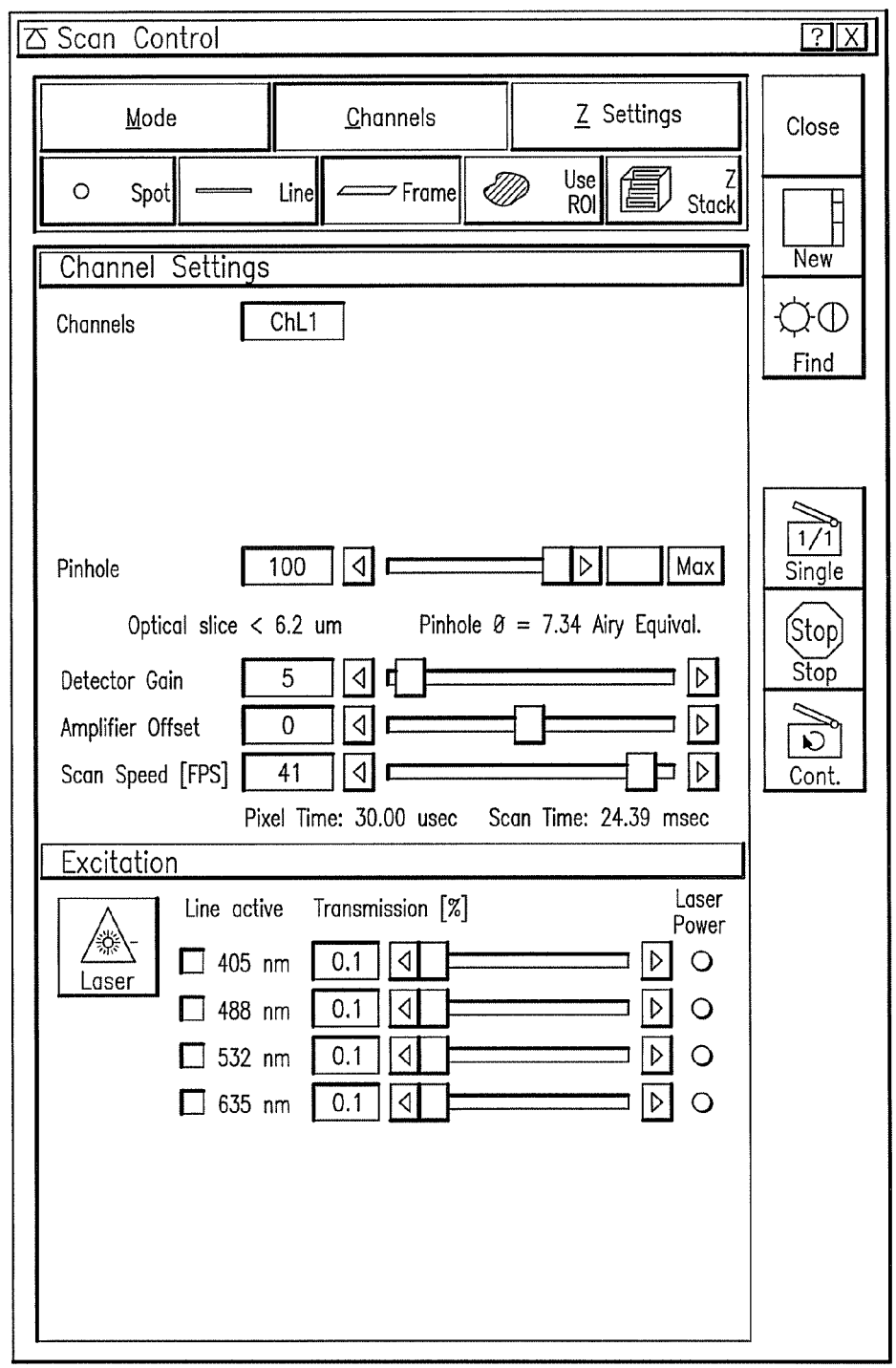
FIG. 11 is a screenshot for the imaging process with an imaging scan module.

The software slider in the operating software represents (analogous to the software interface of "stand alone" LSM systems) the total power for the light demanded by the respective scan module (image forming as well as manipulating systems). Screenshots of a user interface for the user are shown in FIG. 10 for bleaching (as the manipulation application) and in FIG. 11 for the imaging process (with the imaging scan module as described above). Thereby, the power for the individual wavelengths, expressed as percent units, is given in each case by the user in the lower part (excitation). It comprises, as in the generalized FIG. 7a, the quantity of light made available by the variable beam splitter (see box) (λ/2-plate & polarizing beam splitter cube) and the AOM (beam modulation box):

$$P_{actual,Master} = R_{\lambda/2} \cdot T_{AOM,Master}$$

$$P_{actual,Slave} = T_{\lambda/2} \cdot T_{AOM,Master}$$

$$1 \geq P_{actual,Master} + P_{actual,Slave}$$

$$1 \cong R_{\lambda/2} + T_{\lambda/2}$$

wherein $R_{\lambda/2}$ and $T_{AOM}$ represent the fraction of the light reflected by the polarizing beam splitter cube and the fraction of the light transmitted by the AOM. Thereby the designations "Master" and "Slave" stand for the "imaging" or the "manipulating" scan system. The light reflected to the "Master" part of the imaging system after the polarizing beam splitter ($R_{\lambda/2}$) is obtained here from the angular position θ of the λ/2-plate $$R_{\lambda/2} = \cos^2(2\theta)$$

whereby $0 \leq R_{\lambda/2} \leq 1$.

In the present invention, the strategy for the control is so arranged as in FIG. 7b that the λ/2-plate, as the beam splitting element, moves as little as possible:

```
IF P_{ideal, Master} > P_{actual, Master} then
    IF R_{λ/2} > P_{ideal, Master} then
        USE T_{AOM, Master}
    ELSEIF
        USE R_{λ/2}
    ENDIF
ELSEIF (P_{ideal, Master} < P_{actual, Master})
    USE T_{AOM, Master}
ENDIF
```

$P_{ideal}$ is the value specified by the user. In the case of a "yes" result from the comparison in the first box (that is, if $P_{ideal,Master} > P_{actual}$), the controller goes to the next query. In the case of a "no" result (that is, if $P_{ideal,Master}$ is not $> P_{actual}$), the attenuator (AOM) of the master part must be adjusted.

In the next comparison, in the case of a "no" result, the λ/2 plate of the master system has to be adjusted, in the case of a "yes" result, the attenuator (AOM) of the master system has to be adjusted.

However, in the control, the power demanded by the manipulating system ("Slave") comes to an expression as in FIG. 7c. That means that in principle the unused part of the remaining power $(1 - P_{ideal,Master})$ is available to the "slave" system for the manipulation of the sample.

```
IF P_{ideal, Slave} > P_{actual, Slave} then
    IF T_{λ/2} > P_{ideal, Slave} then
        USE T_{AOM, Slave}
    ELSEIF
        USE T_{λ/2}, BUT T_{λ/2, MAX} ≤ (1 - IF P_{ideal, Master})
        USE T_{AOM, Master}
    ENDIF
ELSEIF (P_{ideal, Slave} < P_{actual, Slave}
    USE T_{AOM, Slave}
    ENDIF
```

EXAMPLES

To illustrate the actuation control processes shown in FIGS. 7a-7c with reference to five different user settings, shown in succession, as they may be found in the applications of the systems shown in FIGS. 1 and 5.

The examples 1)-5) follow successively one after the other, whereby the reaction without the manipulating system is described first (ref. FIG. 7b). After that, the final result taking into account the additional power requirement of the manipulator system as in FIG. 7c is explained.

1) Imaging 100%, manipulation 0%, →$R_{\lambda/2}=1$, $T_{AOM,Master}=1$, $T_{\lambda/2}=0$ the λ/2-plate is set to $R_{\lambda/2}=1$, that is, the master (imaging) receives the entire laser energy when the transmission of the corresponding attenuator is maximum ($T_{AOM,Master}=1$), the attenuator is arranged in sequence after the λ/2-plate;

2) Imaging 50%, manipulation 40%

The imaging demands 50% of the available energy, thus a maximum of 50% remains for the manipulation However the manipulation asks for only 40%, so that the manipulation can also actually receive its 40%

For that the λ/2-plate must be regulated, because at that moment all the energy flows in the direction of the imaging system $R_{\lambda/2}=1$, the λ/2-plate is thereby regulated as little as possible and hence moves according to $T_{\lambda/2}=0.4 \rightarrow R_{\lambda/2}=0.6$ (the total is 1).

But now the imaging system receives too much energy (60% because $R_{\lambda/2}=0.6$ and $T_{AOM,Master}=1$), that is, it must now be slightly attenuated: $T_{AOM,Master}=0.8\overline{3}$ Final result: $T_{12}=0.4 \rightarrow R_{\lambda/2}=0.6 \rightarrow T_{AOM,Master}=0.8\overline{3}$, $T_{AOM,Slave}=1.0$ 3) Imaging 50%, manipulation 70%

The manipulation demands 70%, but can have only 50%, because the power requirement of 50% for the imaging system has a higher priority, that is, an increase of 10% from 40% to 50% is possible, and for that the λ/2-plate must be moved slightly, from $R_{\lambda/2}=0.6$ to $R_{\lambda/2}=0.5$; after that the attenuators of both systems are each adjusted to give 100% transmission.

Final result: $T_{\lambda/2}=0.5+R_{\lambda/2}=0.5 \rightarrow T_{AOM,Master}=1.0$, $T_{AOM,Slave}=1.0$, $P_{Slave}=0.5$ (instead of 0.7)

4) Imaging 10%, manipulation 40%

The λ/2-plate can remain as it is, only the attenuators must be readjusted, this is done fast: $T_{AOM,Master}=0.2$, $T_{AOM,Slave}=0.8$ Final result: $T_{\lambda/2}=0.5+R_{\lambda/2}=0.5 \rightarrow T_{AOM,Master}=0.2$, $T_{AOM,Slave}=0.8$, $P_{Slave}=0.4$ 5) Imaging 10%, manipulation 70%

The imaging (master) demands 10% of the laser power, that is, the manipulation can receive 70%; for that the λ/2-plate must be moved: $T_{\lambda/2}=0.7 \rightarrow R_{\lambda/2}=0.3$ After that the attenuators are adjusted so as to yield the total values of 10% and 70% respectively Final result: $T_{\lambda/2}=0.7+R_{\lambda/2}=0.3 \rightarrow T_{AOM,Master}=0.33$, $T_{AOM,Slave}=1.0$ The generalized principle of the control shown in FIGS. 7a-7c describes a method for optimal management of light power with simultaneous operation of two independent scanning systems, whereby at least one source of light can be divided with a variably adjustable ratio of $R_{ST}/T_{ST}$ between two scanning systems by means of a beam splitting element ST;

the power requirement of one scanning system ("Master") is assigned higher priority than that of the other scanning system ("Slave");

suitable intensity modulators are provided for, if necessary, reducing the intensity of the transmitted light distributed between the two partial branches $T_{Master}$ and $T_{Slave}$;

the user of the devices defines only the power required by the two scanning systems through the interface of the operating software, and the control software determines on its own the optimal settings for the variable beam splitting and for the intensity modulators of the master and the slave scan modules.

Figure 6:
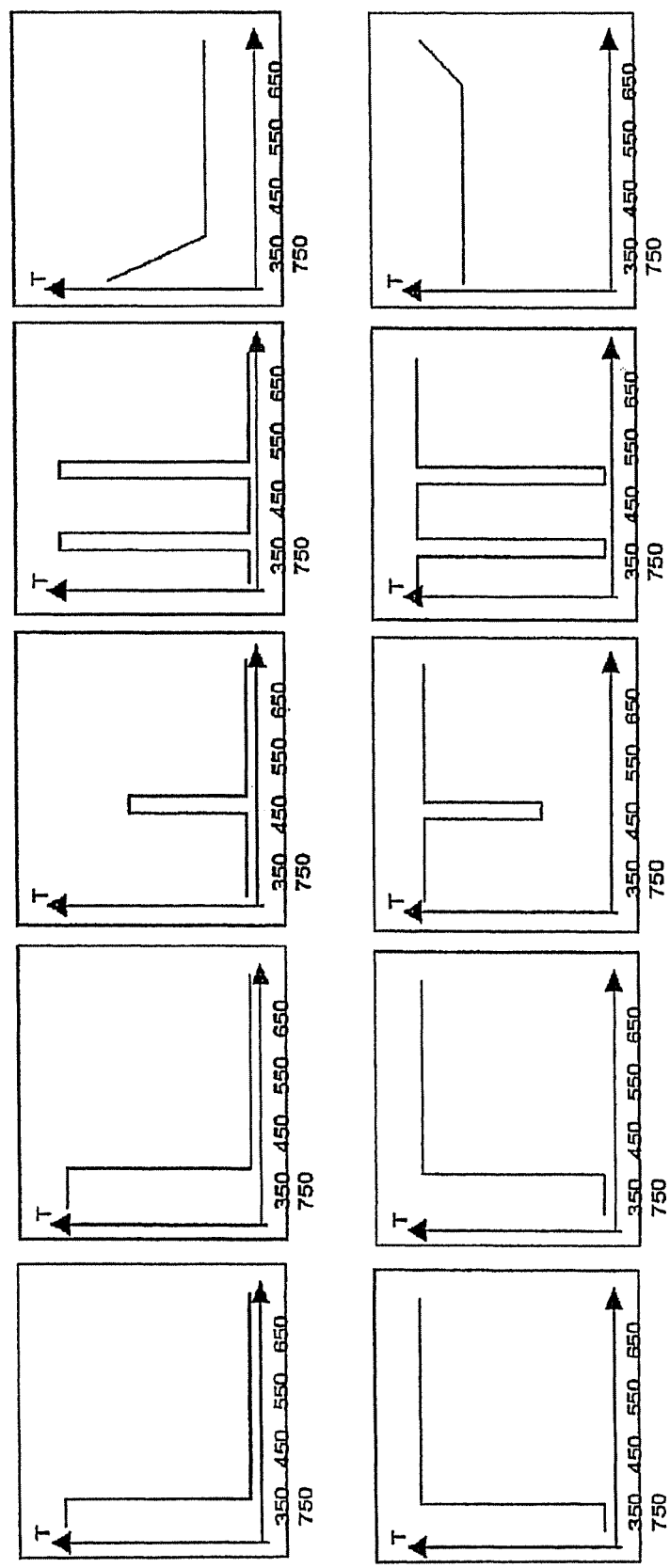
FIG. 6 graphically shows a selection of spectrally possible properties of beam combiners.

FIG. 6 shows a selection of the spectrally possible properties of beam combiner types relevant from the viewpoint of applications, whereby the manipulation wavelengths 355 nm, 405 nm, 488 nm and 532 nm can be used both in the direction of transmission as well as of reflection. Typically, different types of beam combiners are provided with motorized loading devices for exchanging, such as, for example, a motorized reflector revolver, or a reflector slider, in the region of the infinite space between the objective and tube lens.

Neutral combiners (for example T20/R80) can be employed universally as beam combiners for most diverse varieties of applications and, in addition to that, enable applications in a simple manner, in which the same laser wavelengths can be used in simultaneous operation, both of the imaging system as well as of the manipulation system (in particular photobleaching, FRET, FRAP, FLIP). On the other hand, neutral combiners often represent a compromise, especially when the same laser line is used simultaneously for manipulation as well as for imaging, between the branching ratio for the respective laser wavelength, on one hand, and maximizing the signal efficiency in the range of the detection wavelength, on the other hand. Therefore, this demands an optimal design for the beam combiner, which is explicitly optimized for simultaneous operation of a manipulating and an imaging system for the same laser wavelength.

It is evident from FIG. 6 that simultaneous manipulation of the sample and imaging can be realized without problems with the help of a suitable dichroic beam combiner, if both scanning systems use different laser wavelengths. Thus, for example, the beam combiner denoted by "T405" has transmission T>0.9 only within a narrow bandpass range of, for instance, 405 nm±5 nm, whereas ideally it has a mirroring effect with R≈1 in all the other spectral ranges. This beam combiner is thus exclusively suitable for the manipulation of the sample with 405 nm (for example in photoconversion of Dronpa, Kaede, PA-GFP), whereby the manipulating system is arranged in the direction of transmission. Against that, the imaging system is arranged in the reflection direction, and allows, in the case of this special beam combiner type, fluorescence excitation and detection for any wavelength outside the bandpass range of 405 nm±5 nm. In the present invention, there is the requirement of bringing together a laser source that is split between a manipulating system and an imaging system to a beam combiner, whereby the beam combiner design optimally supports the management of the laser power implied in FIGS. 7a-7c. Since both scanning systems thereby simultaneously fall back on the same source of laser wavelength, a dichroic beam-combiner is not suitable for such an application.

Figure 8C:
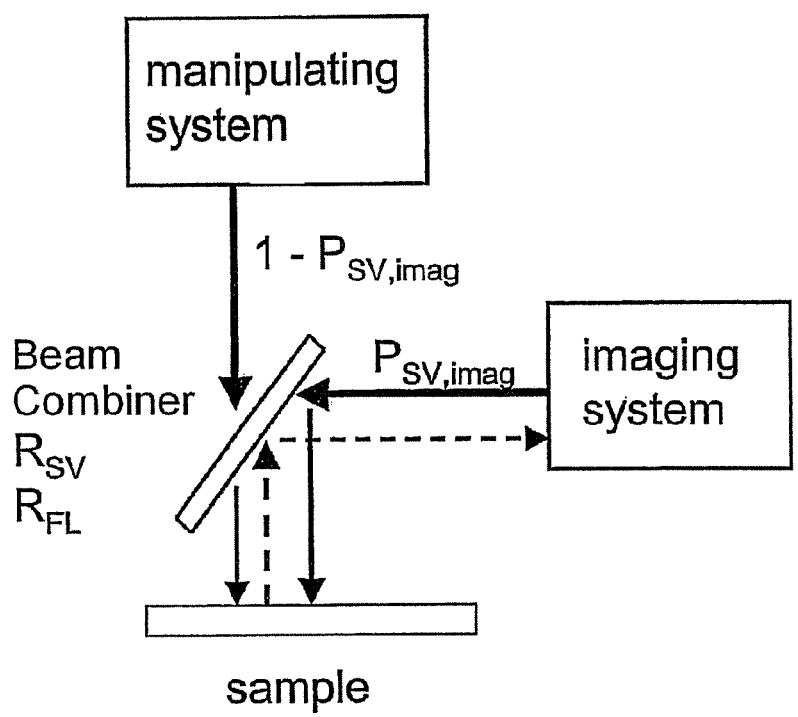

FIGS. 8a-8c elucidate the derivation of a beam combiner design, which is designed especially for simultaneous operation of a manipulating system and an imaging system with the same laser wavelength distributed with a variable ratio. In this way, a comparison is done with the ideal mirror (FIG. 8a), on one hand, and with a neutral combiner (FIG. 8b), on the other hand. FIG. 8a shows a microscope system, which is equipped only with an imaging system, which is arranged in the reflection direction (90° arrangement) with respect to the optical axis of the objective. The beams with the fluorescence excitation light of wavelength λ and the Stokes-shifted fluorescence light of wavelength $\lambda_{FL}$ generated in the sample are incident through an idealized mirror, with the reflectivity being R=1 in the entire spectral range under consideration. In order to generate a suitable fluorescence signal in this imaging system, the normalized relative laser power must be $P_{0,imag}<1$. The total available power of the source of light is 1. In the following considerations, the power $P_{0,imag}$ is taken as the reference value in each case.

FIG. 8b shows a microscope system, which enables simultaneous use of a manipulator arranged in the direction of transmission and an imaging system arranged in the direction of reflection. In use, the laser wavelength λ, split variably between the two scanning systems, is used both for the manipulation of the sample as well as for the fluorescence excitation, whereby the total laser power of the common source of light is again 1. In use, the superposition, accurate to the pixel, of the optical axes of the two scanning systems takes place by means of a neutral beam splitter, which exhibits a constant reflectivity $R_{NV}<1$ in the spectral range of interest. Thus, in the imaging, both the excitation light of wavelength λ as well as Stokes-shifted fluorescence signal of wavelength $\lambda_{FL}$ is reduced in each case by factor $R_{NV}$. The power requirement of the imaging "Master" system (See FIG. 7) follows from the requirement that the same fluorescence signal intensity is detected after the neutral beam combiner as the combiner is arranged in the measurement setup shown in FIG. 8a. The reduction in the intensity on the excitation and the emission side taking place in the neutral beam combiner can thereby each be compensated by a factor $R_{NV}$, whereby, compared to the system in FIG. 8a, laser power that is greater by a factor $1/(R_{NV})^2$ is incident on the neutral combiner. In order to detect the same fluorescence signal intensity as in the arrangement in FIG. 8a, the power requirement of the imaging "Master" module is $$P_{NV,imag} = P_{0,imag}/(R_{NV})^2$$

The remaining laser power $(1-P_{NV,imag})$ of the common source of light of wavelength λ is thus available to the manipulating "Slave" system according to the actuation control schema in FIG. 7, whereby, of this remaining manipulation laser power, again only the part $(1-R_{NV})$ is transmitted in the neutral combiner. The resulting laser power for the manipulation, which can be maximally available in the object plane, thus amounts to $$P_{NV,mani,sample} = (1-P_{NV,imag}) \cdot (1-R_{NV})$$

The optimal reflectivity $R_{NV}$ of the neutral beam combiner is obtained by maximizing the resulting manipulating laser power in the object plane $P_{NV,mani,sample}$ for the same fluorescence signal intensity as in the layout in FIG. 8a. Thus one obtains the following analytical expression for the optimal reflectivity:

$$R_{NV} = \left\{ \sqrt[3]{P_{0,imag} + \sqrt{P_{0,imag}^2 + \left(\frac{P_{0,imag}}{3}\right)^3}} + \sqrt[3]{P_{0,imag} - \sqrt{P_{0,imag}^2 + \left(\frac{P_{0,imag}}{3}\right)^3}} \right\}$$

Example: $P_{0,imag}=0.08$ (8% excitation power for the embodiment of FIG. 8a.) $\Rightarrow R_{NV}=0.4939 \Rightarrow P_{NV,mani,sample}=0.3401$ FIG. 8c now shows a beam combiner design optimized compared to such a neutral combiner. Let this beam combiner have reflectivity $R_{SV}<1$ for the manipulation and fluorescence excitation wavelength λ, whereas let the reflectivity be RFL in the fluorescence wavelength range $\lambda_{FL}$, which is as nearly equal to 1 as possible. In the calculation of the power requirement of the imaging "Master" system, again let the losses appearing on the excitation and the emission side be taken into account, which are compensated by the correspondingly increased laser power $P_{SV,imag}$ of the imaging module. Thereby the laser power incident on the beam combiner is reduced by factor $R_{SV}$, whereas the reverse fluorescence signal is reduced by factor $R_{FL}$. Therefore, in order to detect the same fluorescence signal intensity as in FIG. 8a, the imaging system in FIG. 8c requires the laser power:

$$P_{SV,imag} = P_{0,imag}/(R_{SV}*R_{FL})$$

The remaining power $(1-P_{SV,imag})$ of the common light source of wavelength is thus available to the "slave" manipulation system according to the actuation control principle shown in FIG. 7, whereby, of that, only the part $(1-R_{SV})$ crosses the beam combiner. The resulting laser power for the manipulation, which can be maximally available in the object plane, is thus expressed by:

$$P_{SV,mani,sample} = (1-P_{SV,imag})*(1-R_{SV})$$

The reflectivity $R_{SV}$ of the beam combiner for the excitation and manipulation wavelength is now to be so optimized that for a given fluorescence reflectivity $R_{FL}$ (in the ideal case as nearly equal to 1 as possible) and the same fluorescence signal intensity as in the embodiment of FIG. 8a, a highest possible manipulation laser power $P_{SV,mani,sample}$ in the object plane is obtained. Analytically one obtains the optimum for:

$$[R_{SV}]^{opt} = (P_{0,imag}/R_{FL})^{1/2}$$

Figure 9:
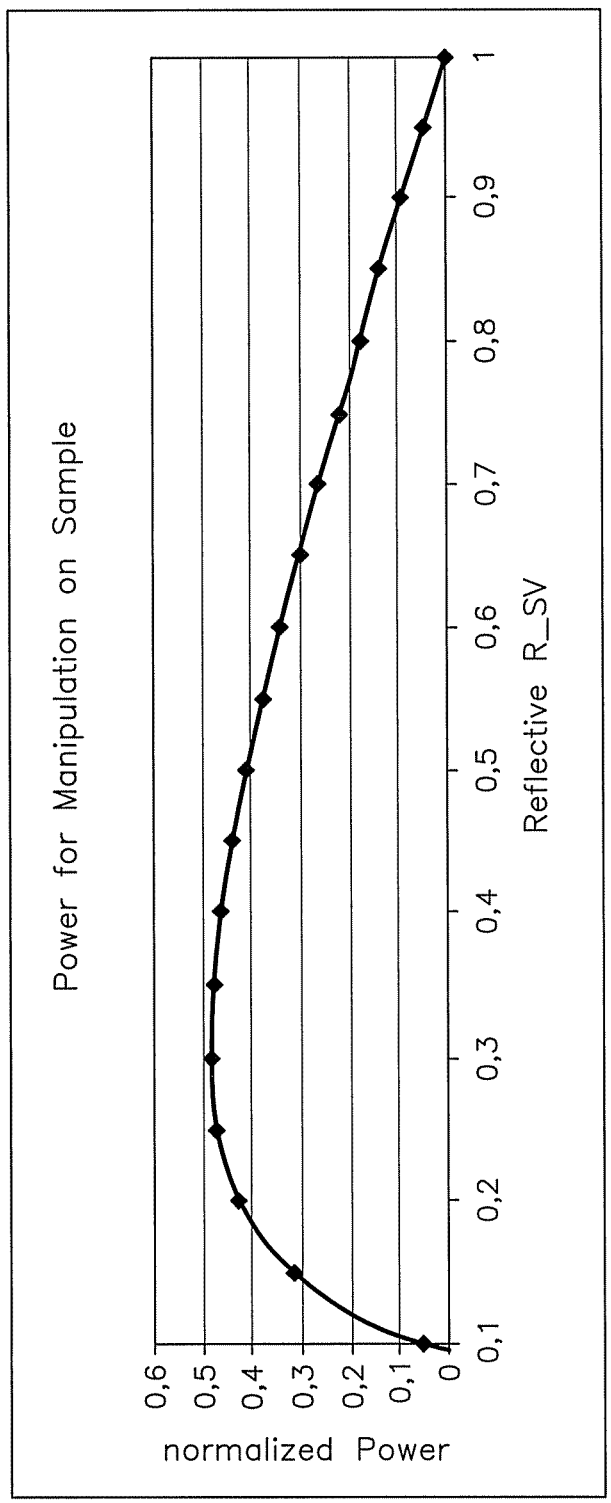
FIG. 9 graphically illustrates the relationship between the $P_{SV,mani,sample}$ and the beam combiner reflectivity RSV.

In FIG. 9, the relationship between the $P_{SV,mani,sample}$ and the beam combiner reflectivity RSV is shown.

Example: $P_{0,imag}=0.08$ (8% excitation power for the embodiment of FIG. 8a.), $R_{FL}=0.85$ $R_{SV}=0.3068$ and $P_{SV,mani,sample}=0.4805$ For the same fluorescence signal intensity in the imaging system, one thus obtains, using this beam combiner, about 30% higher manipulation laser power in the sample—compared to the optimized neutral combiner of the embodiment of FIG. 8b.

If in contrast to the devices shown in FIGS. 8a-8c, the manipulator is instead arranged in the direction of reflection and the imaging scan system is arranged in the direction of transmission, the aforementioned argument follows in analogous manner, whereby in the above mentioned equations the designations for the transmission T and the reflection R must then be mutually exchanged.

To generalize, an optimized beam combiner design for the superposition of the optical axes of two independent scanning systems is required, in which both the modules are operated with at least one common laser wavelength λ. Thereby, at least one of the two scanning systems is designed as an imaging system and its power requirement is assigned higher priority compared to the other scanning system in such a manner that the detected fluorescence signal intensity is comparable with the corresponding "stand alone" system. For the wavelength(s) λ commonly used by both the systems, the branching ratio of this beam combiner is so selected that for a given fluorescence signal intensity, which would correspond to the typical intensity in a "stand alone" scanning system for free passage of the beam without a beam combiner, laser power that is as high as possible in the sample plane is obtained for one scanning system. Outside the common wavelength(s) λ used by the two scanning systems, the beam combiner is so designed that it is either only reflecting or transmitting as far as possible. The optimized spectral design of this beam combiner corresponds therefore to a "bad" bandpass filter in transmission or reflection.

In other words, as the control variables for the method according to the invention serve the grade of the reflectivity ($R_{sv}$, $R_{FL}$) or the transmission of the corresponding beam combiner for the excitation beam and fluorescence beam in the imaging system with respect to the proportion of the manipulation system or if specific power is given, the selection of a suitable beam combiner is optimized as the control variable.

In FIG. 6, two examples for such types of beam combiners are shown schematically. The beam combiner "T488-30%" is thereby so embodied that the imaging system is arranged in the direction of reflection and the manipulating system in the direction of transmission. The wavelength 488 serves thereby both the purpose of the manipulation of the sample as well as of the excitation of fluorescence. The beam combiner layout is so designed that the transmission of 488 nm manipulation light is 70% and the reflection of 488 nm fluorescence signal light is 30%.

Outside the bandpass range of 488 nm, the beam combiner is as reflecting as possible as in FIG. 6, so as to enable efficient signal detection in the direction of reflection. This beam combiner layout is therefore designed for such imaging applications, which require relatively low fluorescence excitation power ($P_{0,imag}$ approximately 8%) and, at the same time, the manipulation power is as high as possible for the wavelength 488 nm. In practice such requirements are of relevance especially in FRAP applications. Thus, in a special embodiment, beam combiners optimized especially for FRAP applications are required. In contrast to that, the beam combiner type "R488-30%," which is schematically depicted in FIG. 6, is optimized for an arrangement in which the imaging system is in the transmission direction and the manipulation system in the reflection direction.

The described invention relates in a general sense to any type of imaging and manipulating system. Besides the (confocal and partially confocal) point and line scanners, it can also be of relevance in particular in multifocal laser scanning systems (for example, those based on lens arrays, diode laser arrays, with any type of beam splitting arrangement) and spinning disk systems/Nipkow systems. Further, in the present invention, the sample can be scanned with a scanning method according to current state-of-the-art. Thereby, one of the following can be the underlying scanning principle of the device for the deflection of the beam in the imaging or the manipulating system:

Galvo mirror or
guidable, in particular rotatable and tiltable, mirrors, for example step motor driven deflecting mirrors
polygon mirrors
acousto-optical deflecting devices, in particular acousto-optical deflectors (AODs)
movable aperture masks, in particular in the form of a Nipkow disk
movable (monomode) fibers
movable objectives or objective parts
mechanical x- and y-adjustment of a suitable component or of the entire scanning system, for example by means of acousto-optical modulators However, since both the scanning systems must be independent of each other in the sense of this invention, a mechanical x- and y-adjustment of the sample is not admissible.

Besides the use of microscope systems with coherent light sources (lasers) and confocal or partially confocal scan modules, an advantageous application of the invention in analogous manner is conceivable also in the simultaneous manipulation of the sample and/or the imaging with the help of (structured) wide-field illumination systems with incoherent light sources.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

We claim:

1. Method for actuation control of a microscope having a common illuminating unit, a beam splitter for splitting light from the common illuminating unit into first and second illumination lights with intensities that can be specified according to an adjustable distribution ratio, a modulator for continuously, variably adjusting the intensity of the second illumination light, an imaging module, and a manipulating module, and wherein the first illumination light is used in the imaging module and moves at least in a first direction and the second illumination light is used in the manipulating module and moves at least in a second direction, the method comprising the steps of:

determining a maximum value of the intensity of the second illumination light based on specified intensities for the first illumination light and the second illumination light, and on the intensity specified for the first illumination light being assigned a higher priority compared to the specified intensity for the second illumination light, controlling at least one of the distribution ratio by which the beam splitter splits the light from the common illuminating unit into the first illumination light and the second illumination light, and an intensity modulation of the second illumination light by the modulator, so that the first illumination light has an actual intensity equal to the specified intensity for the first illumination light and the second illumination light has an actual intensity equal to the maximum value, illuminating a sample with the first and second illumination lights, through a beam combiner; and detecting the light coming from the illuminated sample.

2. The method for actuation control of a microscope according to claim 1, wherein the imaging module is chosen from the group consisting of a wide-field microscope, a point scanning, a line scanning microscope, a microscope scanning with point-distribution; and a Nipkow microscope.

3. The method for the actuation control of a microscope claim 1, wherein the microscope includes a control system, wherein the intensities of the first illumination light and the second illumination light are specified by a user using an interface with the control system, and wherein the controlling step is carried out by the control system.

4. Method for actuation control of a microscope having a common illuminating unit, a beam splitter for splitting light from the common illuminating unit into first and second illumination lights with intensities that can be specified according to an adjustable distribution ratio, and a modulator for continuously, variably adjusting the intensity of the second illumination light, wherein the first illumination light moves at least in a first direction, the second illumination light moves at least in a second direction, the beam splitter is a polarizing beam splitter, and the common illuminating unit includes at least two lasers, the method comprising the steps of:

determining a maximum value of the intensity of the second illumination light based on specified intensities for the first illumination light and the second illumination light, and on the intensity specified for the first illumination light being assigned a higher priority compared to the specified intensity for the second illumination light, controlling at least one of the distribution ratio by which the beam splitter splits the light from the common illuminating unit into the first illumination light and the second illumination light, and an intensity modulation of the second illumination light by the modulator, so that the first illumination light has an actual intensity equal to the specified intensity for the first illumination light and the second illumination light has an actual intensity equal to the maximum value, using $\lambda/2$-plates to adjust the distribution ratio of the beam intensity from each of the at least two lasers at the polarizing beam splitter;

illuminating a sample with the first and second illumination lights, through a beam combiner; and detecting the light coming from the illuminated sample.

* * * * *

UNITED STATES PATENT AND TRADEMARK OFFICE
CERTIFICATE OF CORRECTION

PATENT NO. : 8,780,443 B2
APPLICATION NO. : 12/578202
DATED : July 15, 2014
INVENTOR(S) : Ralf Engelmann et al.

It is certified that error appears in the above-identified patent and that said Letters Patent is hereby corrected as shown below:

On the Title page item (75):
Change

(75) Inventors: Ralf Engelmann, Jena (DE); Joerg Michael Funk, Jena (DE); Bernhard "Zimmerman", Jena (DE); "Ralph" Netz, Jena (DE); Frank Hecht, Weimar (DE)

To be

(75) Inventors: Ralf Engelmann, Jena (DE); Joerg Michael Funk, Jena (DE); Bernhard --Zimmermann--, Jena (DE); --Ralf-- Netz, Jena (DE); Frank Hecht, Weimar (DE)

Signed and Sealed this
Twenty-fifth Day of November, 2014

Michelle K. Lee
*Deputy Director of the United States Patent and Trademark Office*